United States Patent [19]
Keeley et al.

[11] Patent Number: 4,695,943
[45] Date of Patent: Sep. 22, 1987

[54] MULTIPROCESSOR SHARED PIPELINE CACHE MEMORY WITH SPLIT CYCLE AND CONCURRENT UTILIZATION

[75] Inventors: James W. Keeley, Hudson, N.H.; Thomas F. Joyce, Westford, Mass.

[73] Assignee: Honeywell Information Systems Inc., Waltham, Mass.

[21] Appl. No.: 655,473

[22] Filed: Sep. 27, 1984

[51] Int. Cl.[4] .......................... G06F 13/00; G11C 7/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,128,880 | 12/1978 | Cray | 364/200 |
| 4,157,587 | 6/1979 | Joyce et al. | 364/200 |
| 4,169,284 | 9/1979 | Hogan et al. | 364/200 |
| 4,195,342 | 3/1980 | Joyce et al. | 364/200 |
| 4,345,309 | 8/1982 | Arulpragasam | 364/200 |
| 4,378,591 | 3/1983 | Lemay | 364/200 |
| 4,439,829 | 3/1984 | Tsiang | 364/200 |
| 4,493,033 | 1/1985 | Ziegler et al. | 364/200 |
| 4,494,190 | 1/1985 | Peters | 364/200 |
| 4,525,777 | 6/1985 | Webster et al. | 364/200 |
| 4,561,052 | 12/1985 | Tateno | 364/200 |

OTHER PUBLICATIONS

*Computer Structures: Principles and Examples,* by Siewlorek et al., ©1982, pp. 688–694, 743–752.
*Computer Systems Architecture,* by Baer, copyright 1980, pp. 508–517.
IBM Technical Disclosure Bulletin vol. 26, No. 7A, Dec. 1983 "Microprocessor Control of Cached Peripheral Systems", by Hoskinson et al, pp. 3399–3401.

*Primary Examiner*—Archie E. Williams, Jr.
*Assistant Examiner*—Lawrence E. Anderson
*Attorney, Agent, or Firm*—Faith F. Driscoll; John S. Solakian

[57] ABSTRACT

A cache memory unit is constructed to have a two-stage pipeline shareable by a plurality of sources which include two independently operated central processing units (CPUs). Apparatus included within the cache memory unit operates to allocate alternate time slots to the two CPUs which offset their operations by a pipeline stage. This permits one pipeline stage of the cache memory unit to perform a directory search for one CPU while the other pipeline stage performs a data buffer read for the other CPU. Each CPU is programmed to use less than all of the time slots allocated to it. Thus, the processing units operate conflict-free while pipeline stages are freed up for processing requests from other sources, such as replacement data from main memory or cache updates.

33 Claims, 6 Drawing Figures

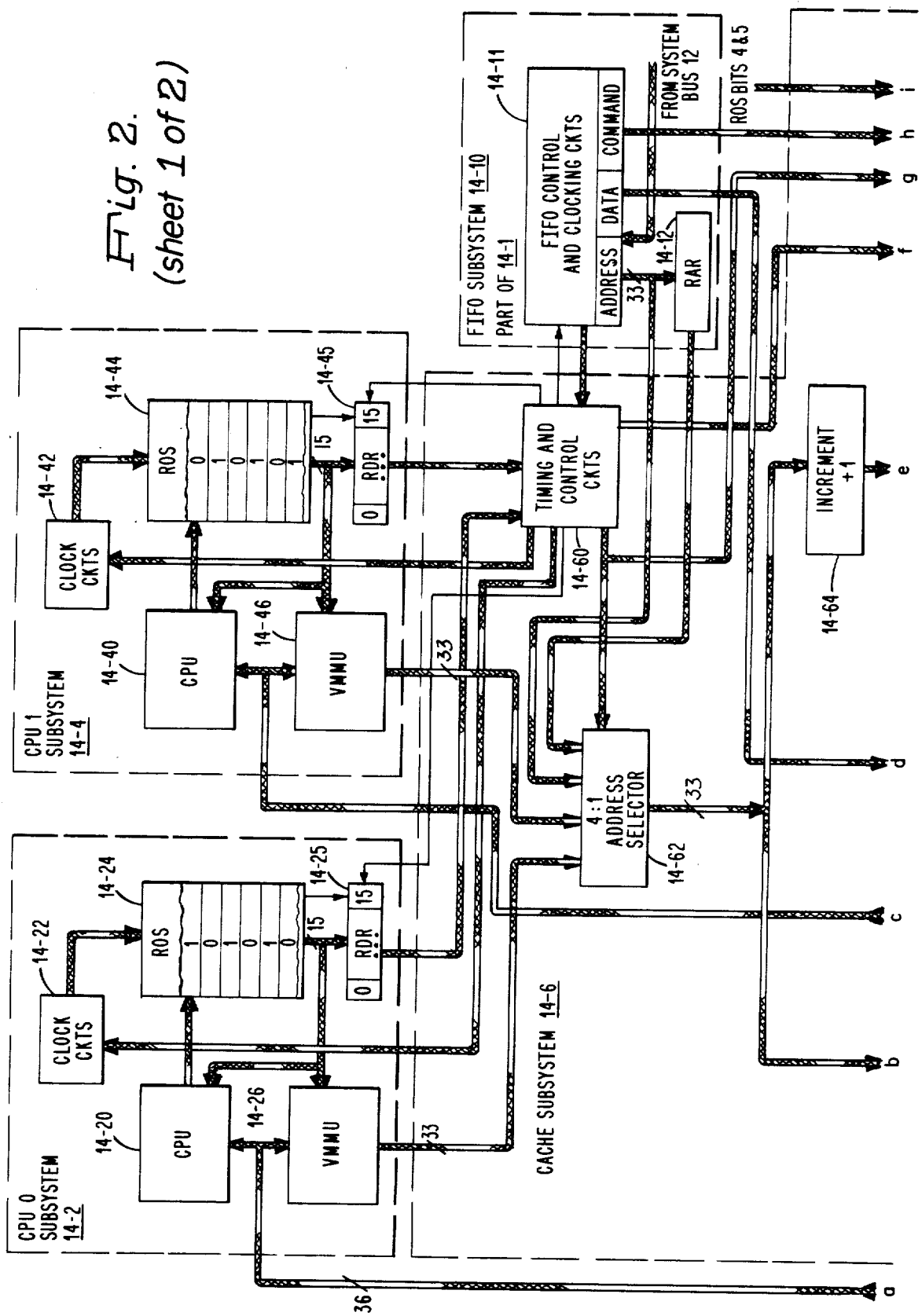
Fig. 2. (sheet 1 of 2)

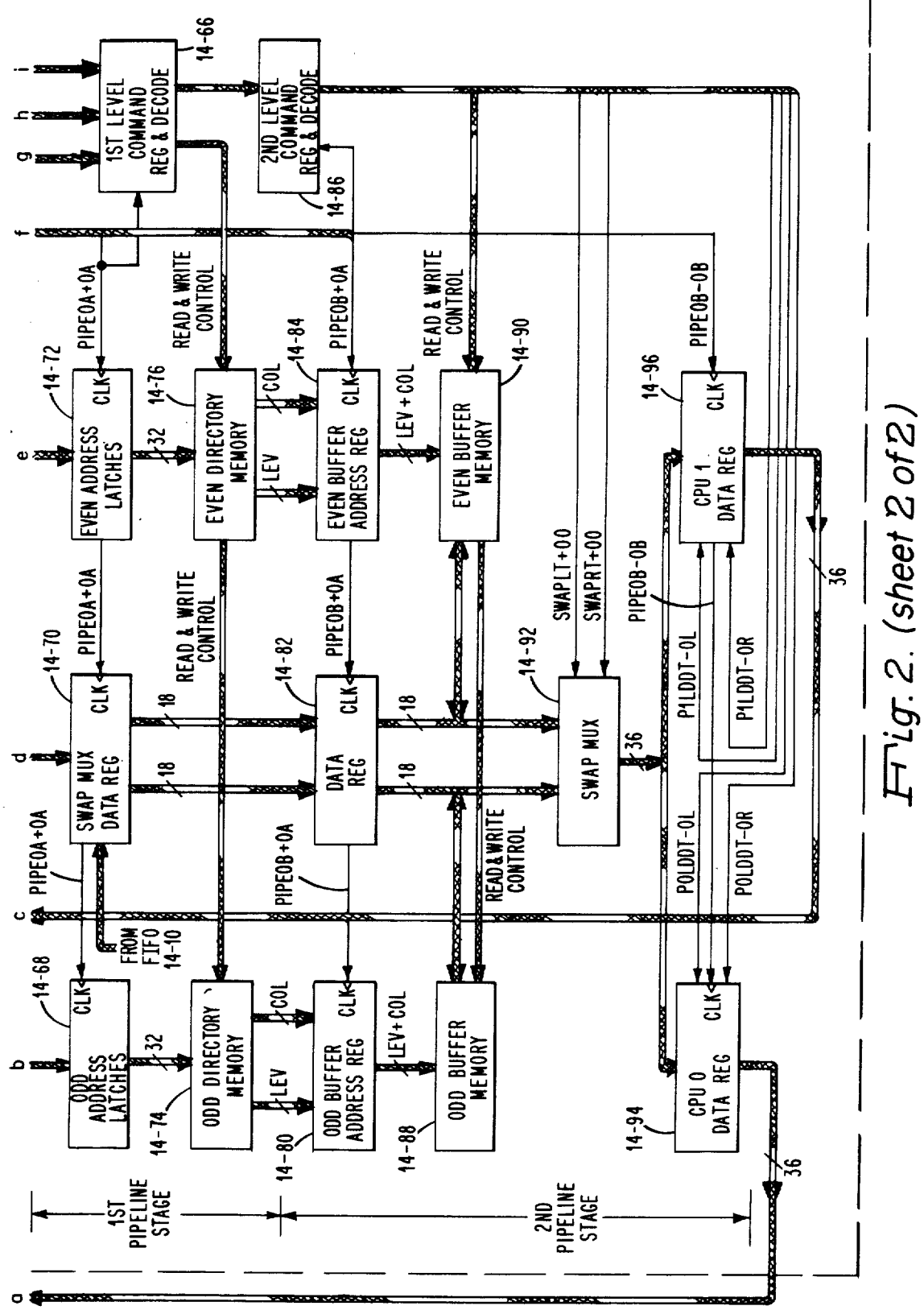
Fig. 2. (sheet 2 of 2)

MULTIPROCESSOR SHARED PIPELINE CACHE MEMORY WITH SPLIT CYCLE AND CONCURRENT UTILIZATION

BACKGROUND OF THE INVENTION

The present invention relates to computer systems and multiprocessor computer systems. More particularly, the present invention relates to multiprocessor systems which include a cache memory system.

It is well known that cache memories have been highly effective in increasing the throughput of small and large uniprocessor and multiprocessor systems. In multiprocessor systems, cache memories are normally configured in either of two ways. The first is a shared cache configuration in which a cache memory is utilized for one or several main memory modules. It is accessible by all of the processors within the system. The second configuration is a private cache arrangement in which the cache memory is dedicated to a single processor. These configurations are described in an article titled "Effects of Cache Coherency in Multiprocessors" by Michael Dubois and Fay A. Briggs, IEEE Transactions on Computers, Volume C-31, No. 11, November, 1982.

Additionally, multiprocessor systems have been configured to share a common control unit which includes a cache memory. U.S. Pat. Nos. 4,378,591 and 4,392,200 are examples of these types of systems. In such systems, the processing units connect to a common bus and include arbitration circuits for allocating available bus cycles for accessing the cache memory. It has been found that considerable time is expended in resolving access conflicts among processors. This in turn reduces system performance, in addition to adding to the complexity of the system.

Additionally, in the system disclosed in U.S. Pat. No. 4,378,591 other sources of requests for bus cycles, such as a first in first out (FIFO) memory are included within the cache subsystem. This resource must be granted access to the cache memory via the local bus on a priority basis. The FIFO is granted a higher priority than the processing units, so that information transfers which are commonly main memory write operations would take precedence. That is, the cache update operations are assigned a higher priority than the processor requests which further slow down the performance of the system.

One prior art uniprocessor system utilizes a memory system which contains a cache and main memory implemented by fully segmented pipelines. The system is a single personal computer and as such can only accommodate a single user system. For a discussion of the system, reference may be made to the article entitled "The Memory System of a High-Performance Personal Computer" by Douglas W. Clark, Butler W. Lampson and Kenneth A. Pier, IEEE Transactions on Computers, Volume C-30, No. 10, October, 1981.

Accordingly, it is a primary object of the present invention to provide a high performance cache system which is able to handle requests from a plurality of sources.

It is a further object of the present invention to provide a system which permits independently operating sources to share a cache unit on a conflict-free basis.

SUMMARY OF THE INVENTION

The above objects and advantages are achieved in a preferred embodiment of the present invention. According to the preferred embodiment, a cache memory subsystem is constructed to have two pipeline stages which are shareable by a plurality of sources including a number of independently operated central processing units. The first pipeline stage of the cache memory provides for a directory search and compare operation while the second pipeline stage performs the operations of fetching the requested data from the cache buffer memory and its transfer to the source. The cache memory further includes timing and control apparatus which couples to the sources and allocates each processing unit's time slots to offset their operations by a pipeline stage.

By having the cache memory control apparatus synchronize the operation of the sources, the opportunity for conflict between sources is effectively eliminated thereby increasing system performance. Thus, the cache memory is cycled continuously permitting conflict-free operation of the pipeline stages by all sources.

Additionally, in the preferred embodiment, the central processing unit source is programmed to request use of less than all of the time slots allocated to it by the cache unit. That is, the preferred embodiment, each central processor source requests every other time slot allocated to it. The remaining time slots are then made available to other sources. In the preferred embodiment, one such other source is a first in first out (FIFO) buffer which handles update and replacement requests. The arrangement of the present invention allows these requests to be handled during the free time slots at a rate which prevents any overflow of the buffer.

In greater detail, the preferred embodiment includes a central processing unit subsystem having two central processing units (CPUs). Each CPU has a virtual memory management unit for translating virtual addresses of requests into physical addresses. Each central processing unit is microprogram controlled, such that alternate microinstructions are coded for generating requests every other microinstruction cycle of operation. Synchronization control circuits included within the cache memory generate signals for synchronizing the clock circuits of each central processing unit at different time intervals. These intervals are offset by a sufficient number of time slots so as to provide for a conflict-free operation of such subsystems.

The novel features which are believed to be characteristic of the invention both as to its organization and method of operation, together with further objects and advantages will be better understood from the following description when considered in connection with the accompanying drawings. It is to be expressly understood, however, that each of the drawings is given for the purpose of illustration and description only and is not intended as a definition of the limits of the present invention.

BRIEF DESCRIPTION OF THE DRAWINGS

FIG. 2 is a block diagram of one of the central subsystems of FIG. 1 constructed according to the present invention.

DESCRIPTION OF THE SYSTEM OF FIG. 1

Figure 1:
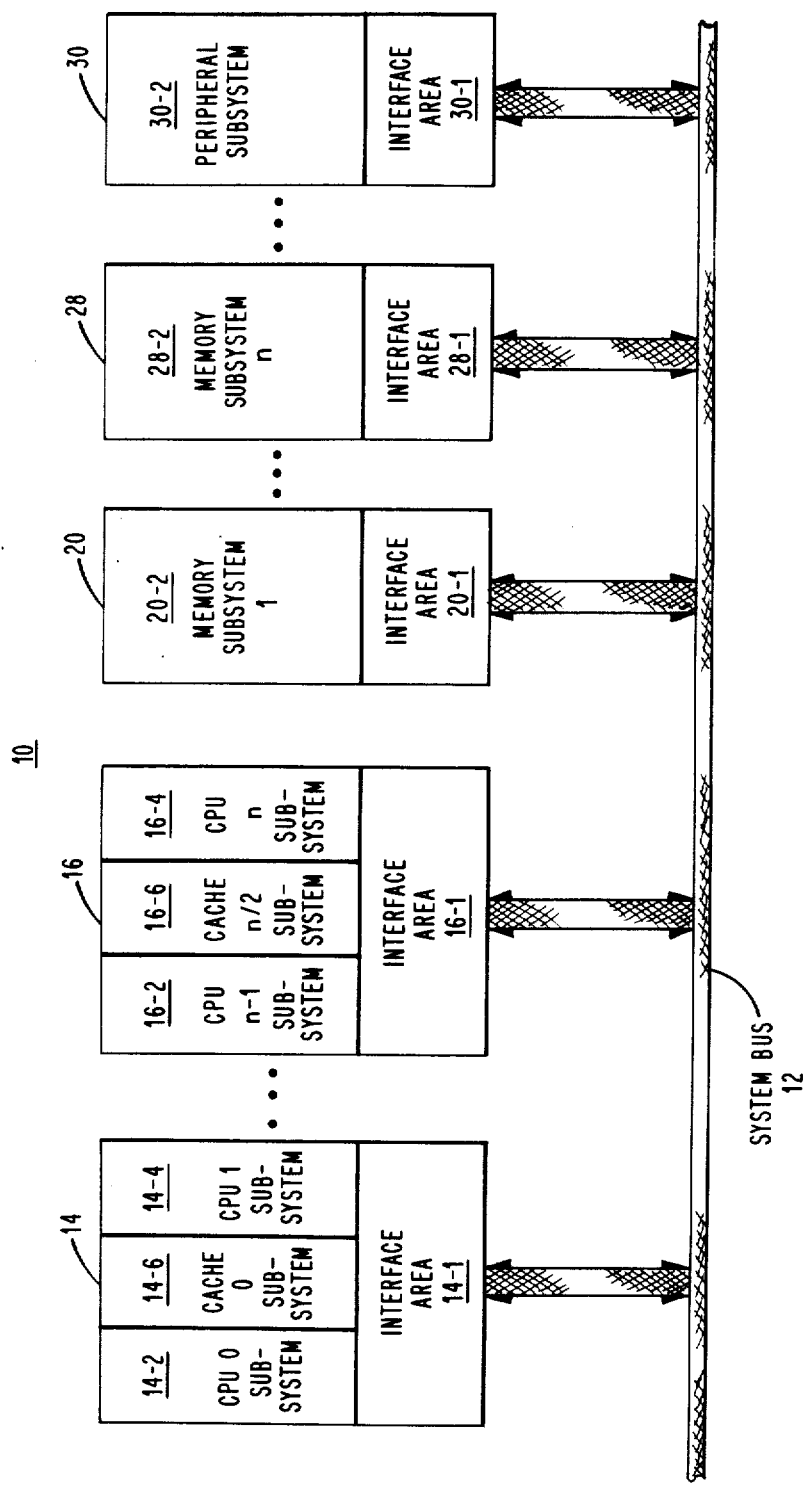
FIG. 1 is a block diagram of a system which includes the apparatus of the present invention.

FIG. 1 shows a multiprocessor data processing system 10 which includes a plurality of subsystems 14 through 30 which couple in common to a system bus 12. The illustrative subsystems include a plurality of central subsystems 14 through 16, a plurality of memory subsystems 20 through 28 and a peripheral subsystem 30. Each subsystem includes an interface area which enables the unit or units associated therewith to transmit or receive requests in the form of commands, interrupts, data or responses/status to another unit on system bus 12 in an asynchronous manner. That is, each interface area can be assumed to include bus interface logic circuits such as those disclosed in U.S. Pat. No. 3,995,258, entitled "Data Processing System Having a Data Integrity Technique", invented by George J. Barlow.

The organization of each of the central subsystems 14 through 16 is the same. FIG. 2 shows in block diagram form central subsystem 14 organized according to the present invention. Subsystem 14 includes a pair of central processing unit (CPU) subsystems 14-2 and 14-4 coupled to share a cache subsystem 14-6. The cache subsystem 14-6 couples to system bus 12 through a first in first out (FIFO) subsystem 14-10 which can be considered as being included within interface area 14-1.

As seen from FIG. 2, both CPU subsystems 14-2 and 14-4 are identical in construction. That is, each CPU subsystem includes a 32-bit central processing unit (CPU) (i.e., CPU's 14-20 and 14-40), and a virtual memory management unit (VMMU) (i.e., VMMU 14-26 and 14-46) for translating CPU virtual addresses into physical addresses for presentation to cache subsystem 14-6 as part of the memory requests. Also, each CPU subsystem includes a read only store (ROS) and a 16-bit ROS data output register (RDR) (i.e., ROS 14-24, 14-44 and RDR 14-25, 14-45).

At the beginning of each cycle, each ROS is conditioned to read out a 16-bit microinstruction word into its data output (RDR) register which defines the type of operation to be performed during the cycle (firmware step/box). The clock circuits within each CPU subsystem (i.e., circuits 14-22 and 14-42) establish the basic timing for its subsystem under the control of cache subsystem 14-6 as explained herein. The elements of each CPU subsystem can be constructed from standard integrated circuit chips.

As seen from FIG. 2, cache subsystem 14-6 is organized into a source address generation section and two separate pipeline stages, each with its own decode and control circuits. The source address generation section includes blocks 14-62 and 14-64 which perform the functions of source address selecting and incrementing. The first pipeline stage is an address stage and includes the circuits of blocks 14-66 through 14-76, arranged as shown. This stage performs the functions of latching the generated source address and directory searching and hit comparing. The first pipeline stage provides as an output information in the form of a level number and a column address. The operations of the first pipeline stage are clocked by timing signals generated by the timing and control circuits of block 14-60.

The information from the first stage is immediately passed onto the second pipeline stage leaving the first stage available for the next source request. The second pipeline stage is a data stage and includes the circuits of blocks 14-80 through 14-96, arranged as shown. This stage performs the functions of accessing the requested data from the buffer memories 14-88 and 14-90, or replacing/storing data with data received from FIFO subsystem 14-10. Thus, the second pipeline stage provides a 36-bit data word for transfer to one of the CPU subsystems. Again, the operations of the second pipeline stage are clocked by timing signals generated by the timing and control circuits of block 14-60.

The different blocks of the first and second pipeline stages are constructed from standard integrated circuits, such as those described in "The TTL Data Book, Volumn 3", Copyrighted 1984, by Texas Instruments Inc. and in the "Advanced Micro Devices Programmable Array Logic Handbook", Copyright 1983, by Advanced Micro Devices, Inc. For example, the address selector circuit of block 14-62 is constructed from two sets of six 74AS857 multiplexer chips cascaded to select one of four addresses. The swap multiplexer of block 14-92 is constructed from the same type chips. The latches of blocks 14-68 and 14-72 are constructed from 74AS843 D-type latch chips. The swap multiplexer and data register circuits of block 14-70 are constructed from a single clocked programable array logic element, such as part number AMPA16R6A, manufactured by Advanced Micro Devices, Inc.

The directory memories 14-74 and 14-76 are constructed from 8-bit slice cache address comparator circuits having part number TMS2150JL, manufactured by Texas Instruments Incorporated. The address and data registers 14-80 through 14-84 and 14-94 and 14-96 are constructed from 9-bit interface flip-flops having part number SN74AS823, manufactured by Texas Instruments, Inc. The buffer memories are constructed from 4K×4-bit memory chips having part number IMS1420, manufactured by INMOS Corporation. The address increment circuits of block 14-64 are constructed from standard ALU chips designated by part number 74AS181A and a programmable array logic element having part number AmPAL16L8A, manufactured by Advanced Micro Devices, Inc.

The first and second levels of command register and decode circuits of block 14-66 and 14-86, respectively, utilize clocked programmable array logic elements having part numbers AmPAL16R4A and AmPAL16R6A, manufactured by Advanced Micro Devices, Inc. These circuits generate the required selection, read and write control signals as indicated in FIG. 2 (i.e., signals SWAPLT+00, SWAPRT+00, P0LDDT-OL, P1LDDT-OL, P0LDDFOR, P1LDDT-OR). For further details, reference may be made to the equations of the Appendix.

As seen from FIG. 2, cache subsystem 14-6 is organized into even and odd sections which permit two data words to be accessed simultaneously in response to either an odd or even memory address. For further information about this type of cache addressing arrangement, reference may be made to U.S. Pat. No. 4,378,591 which is arranged to the same assignee as named herein.

FIG. 2 also shows in block form, FIFO subsystem 14-10 which includes the FIFO control and clocking circuits of block 14-11 which couples to a replacement address register 14-12 and to system bus 12. FIFO subsystem 14-10 receives all of the information transferred between any two subsystems on system bus 12. When the information is for updating data in main memory, the information is coded to indicate such updating or replacement operation. FIFO subsystem 14-10 also receives any new data resulting from a memory request being forwarded to system bus 12 by cache subsystem 14-6. Both update and new data are stored as requests within a buffer memory included within subsystem 14-10. FIFO control circuits decode each request and initiate the appropriate cycles of operation which result in address, data and commands being applied to different parts of cache subsystem 14-6 as seen from FIG. 2. For the purpose of the present invention, FIFO subsystem can be considered conventional in design and take the form of the FIFO circuits disclosed in U.S. Pat. No: 4,195,340 which is assigned to the same assignee as named herein.

Figure 3A:
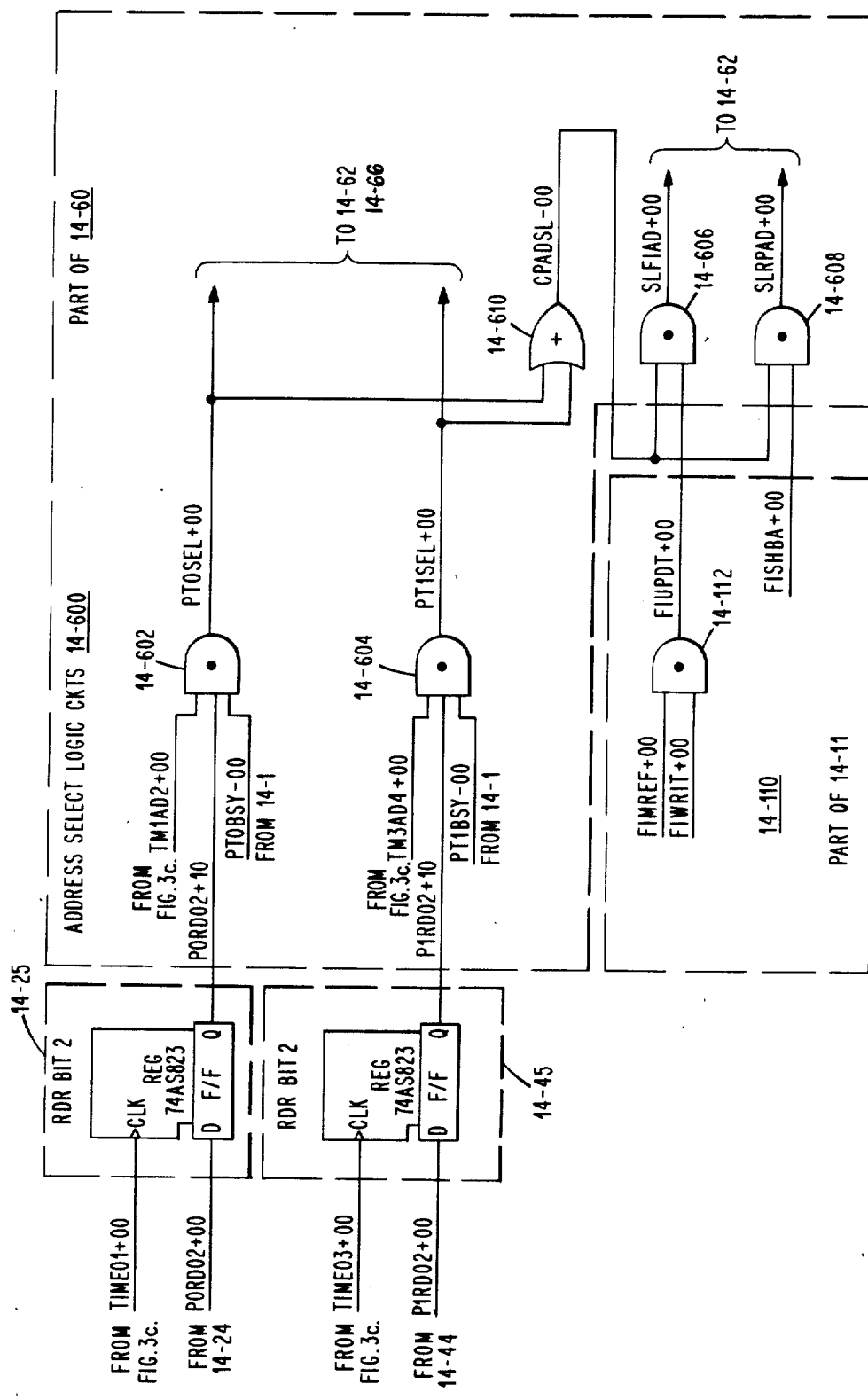
FIGS. 3a through 3c show in greater detail, the timing and control circuits of FIG. 2.

The basic timing for each of the subsystems of FIG. 2 is established by the timing and control circuits of block 14-60. In accordance with the present invention, such control permits the conflict-free sharing of cache subsystem 14-6 by CPU subsystems 14-2 and 14-4 and FIFO subsystem 14-10. The circuits of block 14-60 are shown in greater detail in FIGS. 3a through 3c. FIG. 3a shows address select logic circuits of block 14-600 which generate control signals PT0SEL+00, PT1SEL+00, SLFIAD+00 and SLRPAD+00. These signals are generated in response to CPU cache request signals P0RD02+10 and P1RD02+10 from CPU subsystems 14-2 and 14-4, CPU port busy signals PT0BSY-00 and PT1BSY-00 from interface area 14-1, FIFO signals FIUPDT+00 and FISHBA+00 from FIFO subsystem 14-10 and address timing signals TM1AD2+00 and TM3AD4+00 from the timing circuits of block 14-640. These signals condition address selector 14-62 to select one of the subsystems 14-2, 14-4 and 14-10 as a request address source.

As seen from FIG. 3a, the circuits include AND gates 14-602 through 14-608 and OR gate 14-610. Also, the Figure shows bit position 2 of RDR registers 14-25 and 14-45 and part of FIFO block 14-11 including an AND gate 14-112 which generates signals FIUPDT+00 and FISHBA+00.

Figure 3B:
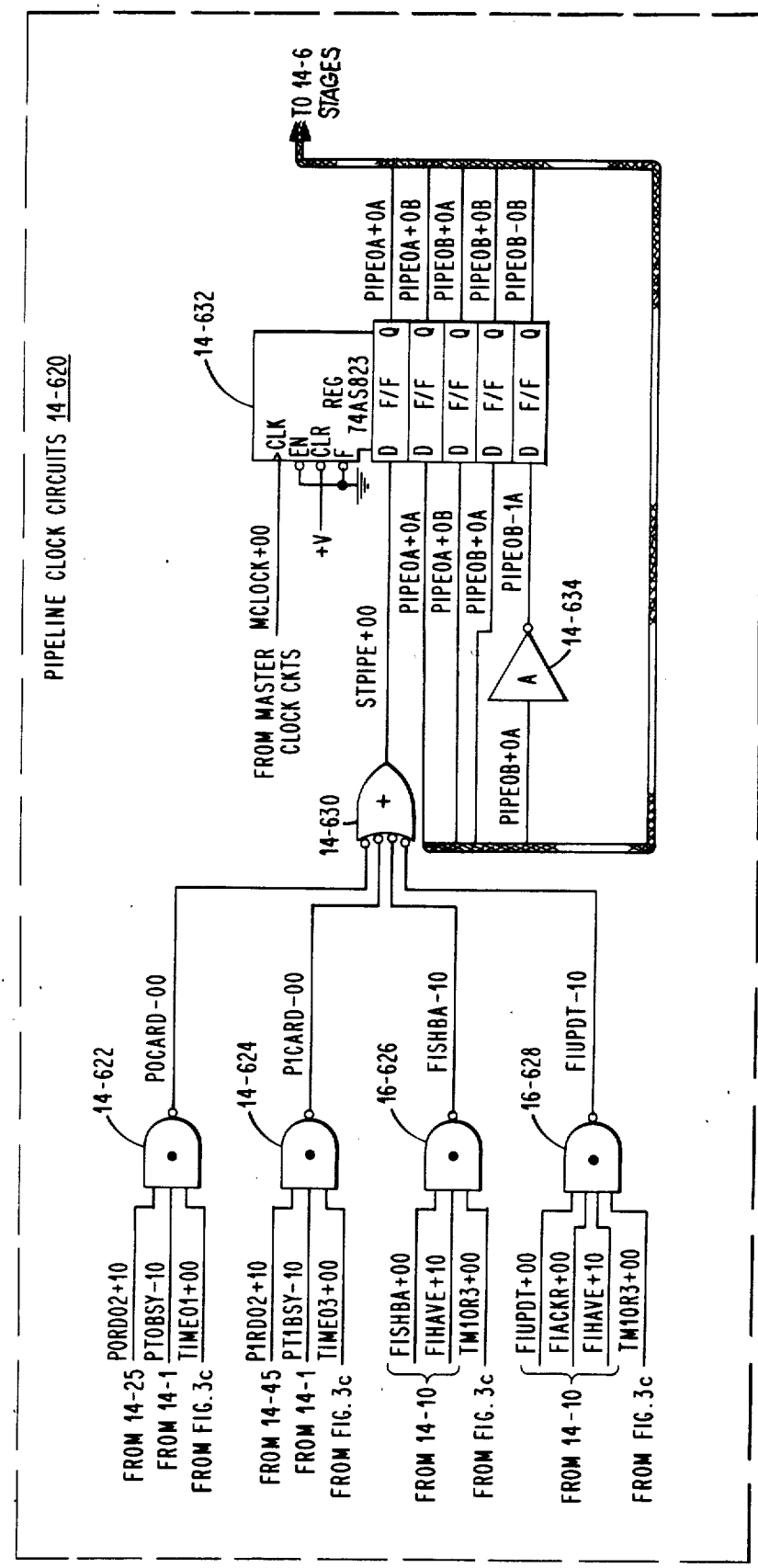

FIG. 3b shows the pipeline clock circuits of block 14-620. These circuits define the different types of cache memory cycles which can initiate the start of the pipeline which results in the generation of signal STPIPE+00. Signal STPIPE+00 conditions a clocked register 14-632 which generates a predetermined sequence of signals in response to each request.

In greater detail, each of the NAND gates 14-622 through 14-628 provides a signal which indicates a type of activity required by one of the subsystems of FIG. 2. That is, signals P0CARD-00 and P1CARD-00 respectively indicate a cache request for service by CPU0 subsystem 14-2 and CPU1 subsystem 14-4 while signals FISHBA-10 and FIUPDT-10 indicate cache requests for service by FIFO subsystem 14-10. These requests can be summarized as follows:

1. CPU0 Read Cycle

A CPU0 read occurs in response to a cache request initiated by ROS 14-24 (i.e., signal P0RD02+10=1) during a first time slot/interval (i.e., signal TIME01+00=1) when CPU port 0 within interface 14-1 is not busy (i.e., signal PT0BSY−10=1). The address supplied by CPU0 subsystem 14-2 is furnished to the first pipeline stage and the directory is read. When a hit is detected, indicating that the requested data is stored in the data buffer, the buffer is read and the data is clocked inot the CPU0 data register. When a miss is detected, the CPU0 port is made busy, the request is forwarded to memory to fetch the requested data.

2. CPU1 Read Cycle

A CPU1 read occurs in response to a cache request initiated by ROS 14-44 (i.e., signal P1RD02+10=1) during a third time slot/interval (i.e., signal TIME03+00+1) during CPU port 1 within interface 14-1 is not busy (i.e., signal PT1BSY−10=1).

3. Second Half Bus Cycle

A second half bus cycle occurs in response to a first type of cache request initiated by FIFO subsystem 14-10 for data requested from either main memory or an I/O device being returned on system bus 12 (i.e., signal FISHBA=1) during a first or third time slot/interval (i.e., signal TM1OR3+00=1) when FIFO subsystem 14-10 has a request stored (i.e., signal FIHAVE+10=1). When FIFO subsystem 14-10 furnishes data from an I/O device to the first pipeline stage, it passes therethrough without changing the states of any memories and is clocked into the appropriate CPU data register. Data from main memory is written into the cache data buffers and is clocked into the appropriate CPU data registers.

4. Memory Write Update Cycle

A memory write update cycle occurs in response to a second type of cache request initiated by FIFO subsystem 14-10 for replacement or update data received from system bus 12 (i.e., signal FIUPDT+00=1) upon acknowledgement of such data (i.e., signal F1ACKR+00=1) during a first or third time slot/interval (i.e., signal TM1OR3+00=1) when FIFO susystem 14-10 has a request stored (i.e., signal FIHAVE+10=1) FIFO subsystem 14-10 furnishes data to the first pipeline stage resulting in the reading of the directory memory. When a hit is detected, the replacement data is written into the buffer memory.

When any one of signals P0CARD-00 through F1UPDT-10 is forced low to a binary ZERO, a NOR OR gate 14-630 (equivalent to a NAND gate) forces start pipe signal STPIPE+00 high to a binary ONE. This conditions register 14-632 to start counting in response to each clock signal MCLOCK+00. Register 14-632 is connected as a ring counter such that the register outputs are fed back to successive register input stages directly or after being inverted by an inverter circuit 14-634 as shown. The register 14-632 continues to count by advancing the pulse loaded into the first stage in response to each occurrence of clock signal MCLOCK+00. This produces a sequence of pulses which corresponds to signals PIPE0A+0A through PIPE0B-0B. Clock signals MCLOCK+00 are generated by crystal oscillator timing circuits, not shown, included within block 14-60. The clock signals MCLOCK+00 are also applied as inputs to CPU clock circuits of blocks 14-22 and 14-42.

Figure 3C:
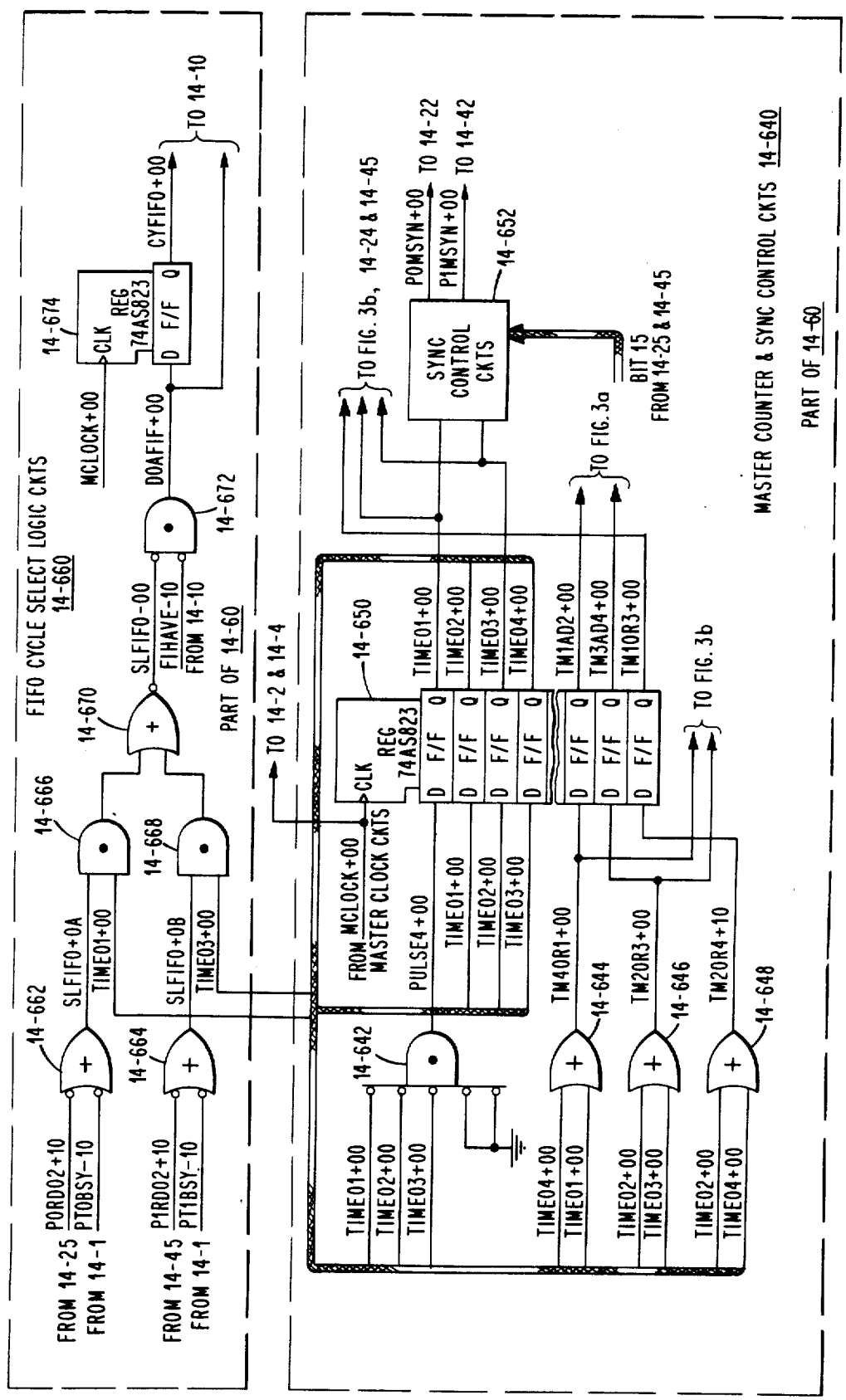

FIG. 3c shows the master counter and sync control circuits of block 14-640 and the FIFO cycle select logic circuits of block 14-660. The circuits of block 14-640, in response to clock signal MCLOCK+00, generate the required sequence of timing signals TIME01+00 through TM1OR3+00 which define the various time slots/intervals during which cache subsystem 14-6 carries out the required operations for processing subsystem cache requests.

The master counter includes a register 14-650 and associated NOT AND and OR gates 14-642 and 14-644 through 14-648 respectively connected as shown. The arrangement operates as a ring counter which is continuously incremented or advanced by each clock signal MCLOCK+00. The master counter applies timing signals TIME01+00 and TIME03+00 to the sync control circuits of block 14-652. These circuits generate signal P0MSYN+00 and signal P1MSYN+00 which are applied to the CPU0 and 1 clock circuits of blocks 14-22 and 14-24, respectively. Each such signal synchronizes the operation of the CPU clock circuits with the cache subsystem timing and control circuits. More specifically, sync signal P0MSYN+00 is applied to an input of the time 02 flip-flop stage of a ring counter register included within block 14-22 while sync signal P1MSYN+00 is applied to an input of the time 02 flip-flop stage of a ring counter register included within block 14-44. Each such signal when present enables the advancement of the CPU clocking circuits at the appropriate time intervals. Signals P0MSYN+00 and P1MSYN+00 are generated so that they remain offset from one another by two time slots/intervals (see Appendix).

The FIFO cycle select logic circuits of block 14-660 include a pair of NOT OR gates 14-662 and 14-664, a pair of AND gates 14-666 and 14-668, a NOR gate 14-670, a NOT AND gate (NAND) 14-672 and a clocked D-type register flip-flop stage 14-674 which connect in series as shown. These circuits generate FIFO cycle signal CYFIFO+00 and FIFO signal DOAFIF+00 during time slots/intervals TIME02 and TIME04 which synchronize the operation of FIFO subsystem 14-10 with that of cache subsystem 14-6 as explained herein.

DESCRIPTION OF OPERATION

With reference to FIGS. 1 through 3c, the operation of the preferred embodiment of the present invention will now be described with reference to the timing diagram of FIG. 4. It is assumed that the ring counter circuits of blocks 14-640 and 14-640 of FIGS. 3b and 3c are cycling or operating (i.e., counting in response to clock signals MCLOCK+00) and that both ROS stores 14-24 and 14-44 have been initialized to predetermined states. As mentioned previously, the ROS words of each ROS store are appropriately coded so as to provide patterns of alternate ONE's and ZERO's defining the cycles allocated to CPU subsystems 14-2 and 14-4. This coding is illustrated in FIG. 2 wherein bit position 2 of each ROS word is appropriately coded.

At the leading edge of signal TIME01+00, the ROS word is clocked into CPU0 ROS data register 14-25. The command field of the ROS word is examined (i.e., bits 0 and 1). When bits 0 and 1 are "10", this specifies that cache subsystem 14-6 is to execute a system bus request wherein data is written or read from a device connected to system bus 12. Assuming that the cache request specifies a main memory read operation, cache subsystem 14-6 reads the cache memory. At this time, ROS data bit 2 is examined to establish whether or not CPU0 is going to utilize the next upcoming cache pipeline cycle which corresponds to time intervals T2 and T3. When bit 2 is a ZERO, this indicates that CPU0 subsystem 14-2 is not going to use the next cache cycle. However, when bit 2 is a ONE, this indicates that CPO subsystem 14-2 is going to use the next cache cycle.

It is assumed that the port circuits for CPU0 subsystem 14-2 are not busy processing another system bus request (i.e., signal PT0BSY−10=1). As seen from FIG. 3b, NAND gate 14-622 forces signals P0CARD-00 to a ZERO which causes NOT OR gate 14-630 to force start pipe signal STPIPE+00 to a binary ONE. As seen from FIG. 4, this signal is valid by the trailing edge of signal TIME01+00. That is, the start pipe signal STPIPE+00 as indicated by the hash marked area is valid until the leading edge of the signal designated as CPU0 cycle in FIG. 4.

It will also be noted that during the time signal STPIPE+00 is being generated, signal P0RD02+10, corresponding to ROS data word bit 2, together with timing signal TM1AD2+00 and port busy signal PT0BSY-00, cause AND gate 14-602 of FIG. 3a to force address select signal PT0SEL+00 to a ONE. This conditions or configures address selector 14-62 to select as the address to be applied to odd and even latches 14-68 and 14-72, the 33-bit address from CPU0 VMMU 19-26.

The start pipe signal STPIPE+00 is applied to ring counter 14-623 of FIG. 3b and clocked into the first bit position on the leading edge of the second clock signal MCLOCK+00. As seen from FIG. 4, this results in the generation of signal PIPE0A+0A.

The first occurrence of start pipe signal STPIPE+00 defines a CPU0 cycle. Signal PIPE0A+0A is applied as a clock input to the address odd and even latches 14-68 and 14-72. The same signal is applied to the first level register and decode circuits of block 14-66 and swap multiplexer data register 14-70. At the leading edge of signal PIPE0A+0A, the latches 14-68 and 14-72 are enabled and at the trailing edge of the signal, the latches are conditioned to store the cache request address generated by CPU0 VMMU 14-26. That is, even address latches 14-72 store an even address value previously incremented by one by increment circuit 14-64 if the original address was odd. The unincremented odd address value is stored in odd address latches 14-68.

The odd and even address contents of latches 14-68 and 14-72 are applied to odd and even directory memories 14-74 and 14-76. Assuming that the requested data resides in cache, the directory memories 14-74 and 14-76 read out the level and column information designating the locations in the respective buffer memories 14-88 and 14-90 where the requested data resides. The decode circuits of block 14-66 generate the appropriate directory read signals which are clocked into the programmable array logic output register in response to signal P1PE0A+0A. This completes the operations performed by the first pipeline stage.

Figure 4:
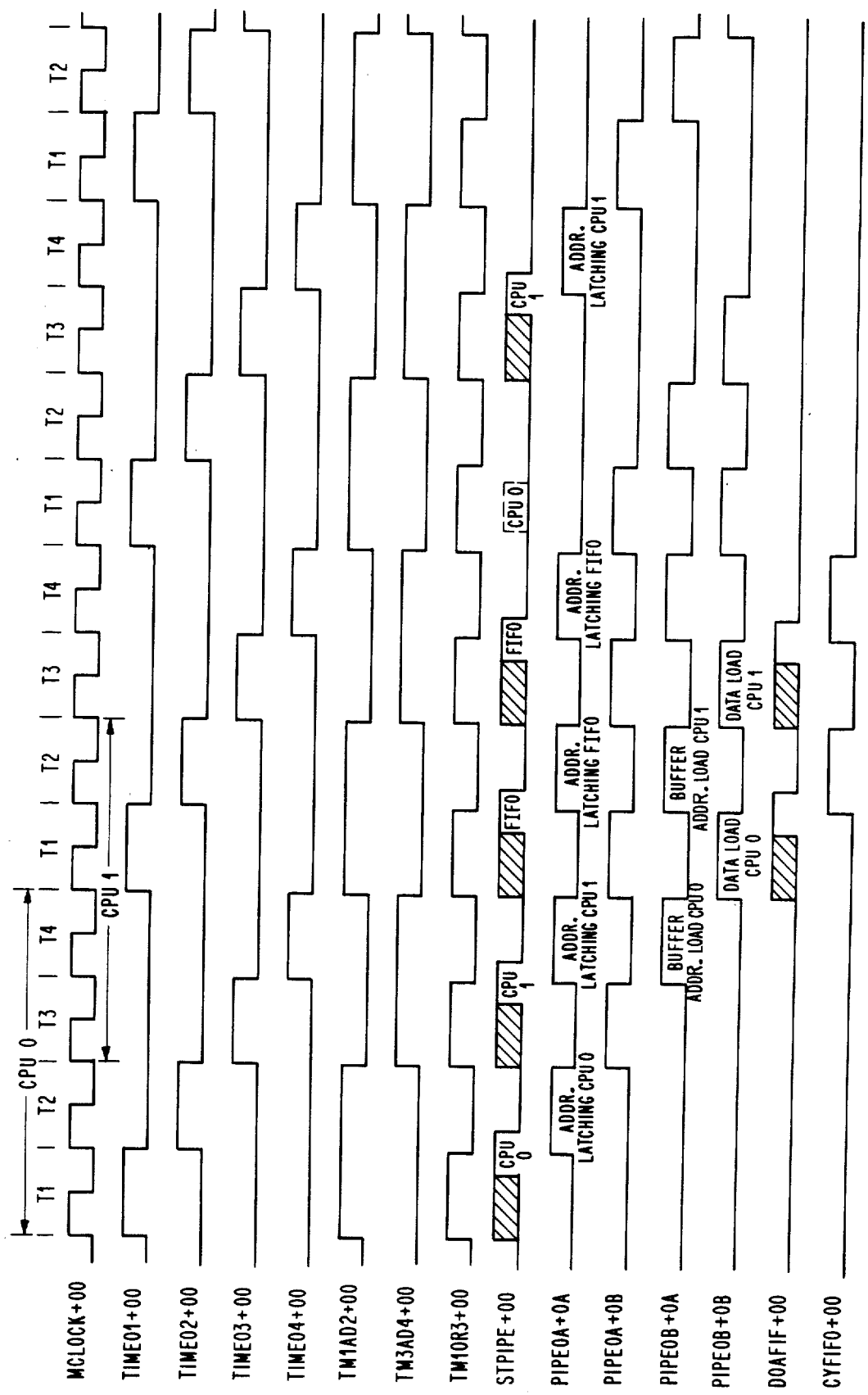
FIG. 4 is a timing diagram used to explain the operation of the apparatus of the present invention.

As seen from FIG. 4, the directory level and column information is loaded into the odd and even address register 14-80 and 14-84 of the second pipeline stage at the leading edge of signal PIPE0B+0A. This signal is generated by ring counter 14-632 in response to third clock signal MCLOCK+00. Signal PIPE0+0B, which is generated in response to the second clock signal MCLOCK+00 is not used.

At the same time, the even and odd address registers 14-80 and 14-84 are clocked by signal PIPE0B+0A, the second level command register and decode circuits of block 14-86 decode the command word resulting in the generation of left and right swapping signals SWAPLT+00 and SWAPRT+00 which are applied to swap multiplexer 14-92. The swapping signals, as well as the other signals produced by the circuits of block 14-86, are clocked into the programmable array logic output register, in response to signal P1PE0B-+0A.

The odd and even data words read out from odd and even buffer memories 14-88 and 14-90 are transferred through swap multiplexer 14-92 as specified by signals SWAPLT+00 and SWAPRT+00. Also, the circuits of block 14-86 generate left half word and right half word signals P0LDDT-0L and P0LDDT-0R which enable a single or double word to be clocked into CPU0 data register 14-94, in response to clock signal PIPE0B-0B. The data words are thereafter transferred under microprogram control to CPU subsystem 14-2.

As seen from FIG. 3b, the signal PIPE0B-0B is the complement of signal PIPE0B+0B of FIG. 4 which is generated by ring counter 14-632, in response to the fourth clock signal MCLOCK+00. This completes the operations of the second pipeline stage.

As seen from FIG. 4, a similar sequence of operations is performed by the first and second pipeline stages in processing a cache main memory request for CPU1 subsystem 14-4. That is, a second start pipe signal STPIPE+00 is generated during time T3 by NAND date 14-624 forcing signal P1CARD-00 to a binary ZERO. During the timing interval T4, when the buffer memory addresses for the CPU0 cache request are being loaded into the registers 14-80 and 14-84, the cache request odd and even addresses from CPU1 subsystem 14-4 are being latched into the odd and even address latches 14-68 and 14-72.

Next, in the case of another cache hit, the directory memories 14-74 and 14-76 read out the level and column information designating the locations in odd and even cache buffer memories 14-88 and 14-90 where the requested data resides. In respose to signal PIPE0B-+0A, this information is loaded into odd and even address registers 14-80 and 14-84. At the same time, the circuits of block 14-86 by command decoding generate left and right swapping signals SWAPLT+00 and SWAPRT+00, as well as signals P1LDDT-0L and P1LDDT-0R.

The result is that the data words read out from odd and even buffer memories 14-80 and 14-84 and transferred via swap multiplexer 14-92 are clocked into CPU1 data register 14-96. This completes the processing of the second cache request.

It is now assumed that FIFO subsystem 14-10 requires servicing which results in the generation of a third start pipe signal STPIPE+00. This cycle can result from either one of the two types of requests as discussed above.

According to the present invention, FIFO subsystem 14-10 is serviced whenever there is a free pipeline stage. A free pipeline stage occurs during time T1 when CPU0 ROS data bit 2 is a ZERO or during time T3 when a CPU1 ROS data bit 2 is a ZERO. This enables FIFO subsystem 14-10 to be serviced during these times. Hence, FIFO cycles occur at time 2 and time 4 when the corresponding CPU subsystems do not request cache cycles.

In FIG. 4, it is assumed that CPU0 subsystem 14-2 and CPU1 subsystem 14-4 do not use the following T1 and T3 time slots/cycles. When FIFO subsystem 14-10 generates a cache write update request, the source of the cache request address is from the FIFO address portion of the command furnished by the circuits 14-11. That is, address selector 14-62 is conditioned or configured to transfer this address into odd and even latches 14-68 and 14-72.

Signal PIPE0A+0A clocks the information into the latches while at the same time, data from FIFO subsystem circuits 14-11 is clocked into the swap register of block 14-70. The programming array logic circuits of block 14-70 are conditioned by signals from the FIFO subsystem 14-10 (i.e., address bit 22) to properly align the left and right data word halves which are then clocked into the swap register on the leading edge of signal PIPE0A+0A.

As seen from FIG. 4, in the case of a hit, signal PIPE0B+0A loads the level and column information into odd and even address registers 14-80 and 14-84 designating locations in odd and even cache buffer memories 14-88 and 14-90 where the data to be updated resides. At the same time, the update data is clocked into data register 14-82. Thereafter, the update data is written into odd and even buffer memories 14-88 and 14-90 under the control of write signals generated by the decode circuits of block 14-86. As seen from FIG. 3c, the circuits of block 14-660 force signal DOAFIF100 to a binary ONE when signal P0RD02+10 is a ZERO During Time T1 (i.e., signal TIME01+00=1). As seen from FIG. 4, signal DOAFIF+00 forces signal CYFIFO+00 to a binary ONE in response to clock signal MCLOCK+00. Signal CYFIFO+00 is applied to the FIFO circuits of block 14-11 and results in incrementing internal FIFO counter circuits which complete the processing of the request stored within FIFO subsystem 14-10. This also completes the processing of the FIFO request by cache subsystem 14-6.

It is assumed that during the next FIFO cycle, the FIFO subsystem 14-10 furnishes a cache replacement request which causes NAND gate 14-626 of FIG. 3b to force signal FIUPDT-10 to a ZERO. This results in the generation of the fourth start pipe signal STPIPE+00. In this instance, the RAR register 14-12 will have been loaded when the request was initially forwarded to system bus 12 in response to a CPU cache request. Accordingly, a similar sequence of operations is carried out by cache subsystem 14-6.

It will be noted that FIFO cycles are initiated by signal DOAF1F+00 at time T1 and time T3, respectively, when signal P0RD02+00 or PT0BSY-10 is a ZERO and signal P1RD02+10 or PT1BSY-10 is a zero. This causes FIFO cycles to occur at times T2 and T4. In each case, when both signals (i.e., P0RD02+10, PT0BSY-10 AND P1RD02+10, PT1BSY-10) are ONEs, this precludes the generation of either signal SLFIF0+0A or signal SLFIF0+0B which precludes the occurrence of a FIFO cycle. Thus, the FIFO cycles are overridden when the CPU subsystem allocated the time slot/cycle is utilizing the cycle.

Under worst case conditions, there can be at most two requests stacked up in FIFO subsystem 14-10. Thus, there can be up to two FIFO cycles occurring back to back when the FIFO subsystem 14-10 is full as illustrated in FIG. 4 as discussed above. The arrangement of the present invention ensures that there are always enough free pipeline stages to service FIFO subsystem 14-6 at the maximum rate at which it receives requests from system bus 12. This is achieved by allowing each CPU subsystem to utilize a cache cycle every other microinstruction word/firmware box. For CPU subsystem 14-2, every other microinstruction word read out each time T1 can specify a cache request. The same is true for CPU subsystem 14-4, for the microinstruction word read out every time T3. In this manner, cache subsystem 14-6 can process cache requests from a number of sources without conflict or contention.

It will be appreciated that when cache subsystem 14-6 detects a miss condition in response to a CPU cache request, this will result in interface area circuits 14-1 forcing the port circuits to a busy state (i.e., signal PT0BSY-10 or PT1BSY-10 is forced to a ZERO). This, in turn, is forwarded back to the CPU subsystem causing it to stall its operation. Since this operation is not pertinent to the understanding of the present invention, it will not be further discussed.

From the above, it is seen how the present invention permits expeditious processing of cache requests from a plurality of sources. It permits the time sharing of a cache subsystem among the different subsystems of a multiprocessor system on a conflict-free basis. This allows the continued processing of cache requests from other sources when the data requested by one source does not reside in cache.

APPENDIX

The equations for generating the signals of FIG. 2 are given by the following Boolean expressions:

1. $*P0LDDT - OL = \underbrace{CPUCYL \cdot \overline{CPUNUM} \cdot DBWDRD \cdot EVNHIT \cdot ODDHIT}_{\text{CPU READ CYCLE}} +$ $\underbrace{CPUCYL \cdot \overline{CPUNUM} \cdot \overline{DBWDRD} \cdot \overline{CMAD22} \cdot \overline{CMAD23} \cdot EVNHIT}_{\text{CPU READ CYCLE}} +$ $\underbrace{CPUCYL \cdot \overline{CPUNUM} \cdot \overline{DBWDRD} \cdot CMAD22 \cdot \overline{CMAD23} \cdot ODDHIT}_{\text{CPU READ CYCLE}} +$ $\underbrace{\overline{CPUCYL} \cdot \overline{FIAD17} \cdot FISHBA \cdot RPMREF}_{\text{I/O SHBC}} + \underbrace{\overline{CPUCYL} \cdot FIAD17 \cdot FISHBA \cdot RPMREF}_{\text{MEM SHBC}}.$ 2. $*P0LDDT - OR = \underbrace{CPUCYL \cdot \overline{CPUNUM} \cdot DBWDRD \cdot EVNHIT \cdot ODDHIT}_{\text{CPU READ}} +$ $\underbrace{CPUCYL \cdot \overline{CPUNUM} \cdot \overline{DBWDRD} \cdot \overline{CMAD22} \cdot EVNHIT}_{\text{CPU READ}} +$ $\underbrace{CPUCYL \cdot \overline{CPUNUM} \cdot DBWDRD \cdot CMAD22 \cdot ODDHIT}_{\text{CPU READ}} +$ $\underbrace{\overline{CPUCYL} \cdot \overline{FIAD17} \cdot FISHBA \cdot RPMREF + \overline{CPUCYL} \cdot FIAD17 \cdot FISHBA \cdot RPMREF}_{\text{I/O SHBC}}.$ 3. $*P1LDDT - OL =$ same as 1 except $\overline{CPUNUM} = CPUNUM$.

4. $*P1LDDT - OR =$ same as 2 except $\overline{CPUNUM} = CPUNUM$.

5. $*SWAPLT = \underbrace{CPUCYL \cdot CMAD22}_{\text{CPU READ}} + \underbrace{\overline{CPUCYL} \cdot FISHBA \cdot RPMREF \cdot RPAD22}_{\text{MEM SHBC}}.$ 6. $*SWAPRT = \underbrace{CPUCYL \cdot DBWDRD \cdot CMAD22}_{\text{CPU READ}} + \underbrace{CPUCYL \cdot \overline{DBWDRD} \cdot \overline{CMAD22}}_{\text{CPU READ}} +$ $\underbrace{\overline{CPUCYL} \cdot FISHBA \cdot RPMREF \cdot (FIDBWD \cdot RPAD22 + \overline{FIDBWD} \cdot \overline{RPAD22})}_{\text{MEM SHBC}}.$ 7. $CPUCYL = P0RD02 \cdot TM1AD2 + P1RD02 \cdot TM3AD4 = PT0SEL + 00 + PT1SEL + 00.$
8. $CPUNUM = P1RD02 \cdot TM3AD4 = PT1SEL + 00.$ 9. $\overline{CPUNUM} = P0RD02 \cdot TM1AD2 = PT0SEL + 00.$ 10. $P0MSYN + 00 = DATA\ AVAIL \cdot TIME01 + \overline{P0RD15} \cdot TIME01$ where $DATA\ AVAIL = P0LDDT - OL \cdot P0LDDT - OR.$ -continued 11. P1MSYN + 00 = DATA AVAIL · TIME03 + $\overline{\text{PORD15}}$ · TIME03 where

DATA AVAIL = P1LDDT − OL · P1LDDT − OR.

*These signals are clocked with signal PIPE0B + 0A.

DESCRIPTION OF EQUATION TERMS

1. DBWDRD = double word read command defined by ROS data bit 4 = 1 and ROS data bit 5 = 0 generated by the decode circuits of block 14-66 which is clocked with signal PIPE0A + 0A.
2. CPUNUM = CPU number (CPU0 or CPU1) signal generated by the circuits of block 14-66 which is clocked with signal PIPE0A + 0A.
3. CPUCYL = CPU cycle signal generated by the circuits of block 14-66 in response to signals PT0SEL + 00 and PT1SEL + 00 and which is clocked with signal PIPE0A + 0A.
4. EVNHIT = hit signal generated by even directory memory 14-76, which is applied to the decode circuits of block 14-86.
5. CMAD22 = cache memory address bit 22 generated at the output of selector 14-62.
6. CMAD22 = cache memory address bit 23, generated at the output of selector 14-62, specifies which half (left or right) of data register 14-94 or 14-96 is to be loaded with a data word.
7. FIAD17 = FIFO address bit 17 from FIFO subsystem 14-11 defines which CPU is to receive the replacement data.
8. FIDBWD = FIFO double-wide word command bit from FIFO subsystem 14-11 specifies when the data being returned has two words.
9. FISHBA = FIFO second-half bus cycle acknowledge signal from 14-11 specifies that the FIFO subsystem requires a cache cycle to process data received from an I/O device or memory during a second half bus cycle SHBC.
10. ODDHIT = hit signal generated by odd directory memory 14-74, which is applied to the decode circuits of block 14-86.
11. RPMREF = memory reference signal provided by RAR 14-12 which permits any exception conditions to be taken into account.
12. RPAD22 = replacement address bit 22 from RAR 14-12.

It will be appreciated by those skilled in the art that many changes may be made to the preferred embodiment of the present invention. For example, the system timing may be changed as, for example, different time slots may be allocated to the subsystems, as well as the coding of ROS memories 14-24 and 14-44 may be altered to utilize different cycles (e.g. every third, fourth, etc.). Also, the number of bits and cache width may be altered (i.e., process single, double or quad words). Other changes will be as apparent to those skilled in the art.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:
1. A data processing system comprising:

a plurality of data requesting sources, each operative to generate memory requests for data, each request including an address; and, a cache memory unit having a number of pipeline stages and coupled to receive said memory requests from said data requestng sources, said unit including:

timing and control means for generating sequences of timing signals, said timing and control means being coupled to apply said timing signal to each of said sources for synchronizing their operations with said cache unit, said each sequence of timing signals defining a number of time intervals in which a different one of said intervals is preallocated for access to a first one of said pipeline stages by each of said plurality of said sources for receiving said requests;

a first one of said pipeline cache stages being coupled to said sorces and to said timing and control means to receive phase control signals from said timing and control means generated in response to a request being received from one of said sources during a preallocated interval, said first pipeline stage being enabled by said phase control signals to generate information signals during a following one of said time intervals for accessing said requested data specified by said request address when stored in said cache memory unit; and, a second one of said pipeline cache stage being coupled to receive said phase control signals from said timing and control means, to said first pipeline stage and to said sources, said second pipeline stage being conditioned by said phase control signals to receive said information signals and access the designated data during a following another one of said time intervals for transfer to the requesting source thereby enabling the conflict-free concurrent processing of requests from said plurality of data requesting sources such that a first data requesting source can be utilizing the first pipeline stage while another data requesting source is utilizing the second pipeline stage.

2. The system of claim 1 wherein said cache memory unit further includes:

address selection means coupled to said first pipeline cache stage and to each of said sources for receiving said addresses of said requests, and wherein said timing and control means includes:

address select logic means coupled to said plurality of data requesting sources and to said address selection means, said address select logic means in response to cache request signals received from said sources generating selection signals for enabling said address selection means to transfer to said first pipeline cache stage, said request address received from said one of said sources during said one of said preallocated time intervals.

3. The system of claim 2 wherein said timing and control means further includes:

master timing means being operative to generate said sequences of timing signals repetitively, each defining said number of time intervals; and, start pipeline clocking means for generating said phase control signals, said clocking means being coupled to said master timing means and to each of said sources, said start pipeline clocking means including:

a plurality of cycle generating means, each coupled to a different one of said sources and to said master timing means, and pipeline timing means coupled to said plurality of cycle generating means and to each of said pipeline stages, said cycle generating means generating a predetermined sequence of phase control signals, different ones of said phase control signals causing said pipeline stages to carry out concurrently those operations requires to complete the processing of said requests during each cache cycle of operation.

4. The system of claim 3 wherein said system further includes a system bus and a FIFO buffer subsystem coupled to said system bus, said plurality of data requesting sources including a number of central processing unit subsystems, each subsystem being coupled to at least one different one of said plurality of cycle generating means, each of said central processing unit subsystems being enabled during each of said preallocated time intervals to cause a corresponding one of said cycle generating means to initiate a read cycle of operation to fetch data from said cache memory unit and said FIFO buffer subsystem being operative during those preallocated time intervals unused by said central processing subsystems to cause different ones of said cycle generating means to initiate cache cycles for processing replacement and update data received from said system bus.

5. The system of claim 1 wherein said first one of said pipeline stages includes:

directory memory means coupled to said timing and control means, said directory memory means having a plurality of locations for storing directory addresses specifying where data is stored in said cache memory unit and means for generating hit signals indicating whether or not the requested data is stored in said second stage; and, first level command decode means coupled to said directory memory means, to said timing and control means and each of said data requesting source, said first level command decode means in response to said request being enabled during said following one of said preallocated time intervals to generate control signals causing said directory memory means to read out said information signals and generate said hit signals for accessing said requested data from said second stage.

6. The system of claim 5 wherein said second one of said pipeline stages includes:

buffer memory means having a plurality of storage locations defined by corresponding ones of said directory addresses;

output data regisater means coupled to said buffer memory means, to said timing and control means and to each of said data requesting sources; and, second level command decode means coupled to said buffer means, to said timing and control means, and to said first level command decode means, said second level comand decode means being conditioned by said phase control signals generated during said following another one of said time intervals to generate control signals for causing said buffer memory means to accept said information signals and access said requested data to be stored in said output data register means for said transfer to one of said sources.

7. The system of claim 1 wherein each of said said plurality of said data requesting sources includes:

clocking means coupled to said timing and control means for receiving timing signals which synchronize the operation of said clocking means with said cache memory unit; and, addressable microprogrammed control means coupled to said clocking means and to said timing and control means, said microprogrammed control means for storing and providing microinstructions during control means cycles of operation, a predetermined field of said microinstructions being coded to specify when said cache request is to be made by a corresponding one of said plurality of data requesting sources during each of said preallocated time intervals.

8. The system of claim 7 wherein said predetermined fields of only predetermined ones of said microinstructions of said microprogrammed control means of each of said plurality of said data requesting sources are coded to specify that a cache request is to be made only during cycles defined by those said time intervals preallocated to said each of said plurality of data requesting sources.

9. The system of claim 8 wherein said clocking means of each of said plurality of said data requesting sources conditions said microprogrammed control means to provide said microinstructions during preallocated time intervals which are separated by a predetermined number of time intervals from those preallocated time intervals of another one of said plurality of said data requesting sources for enabling said concurrent processing of requests from said plurality of said data requesting sources.

10. The system of claim 9 wherein said predetermined number is two and wherein a first one of said plurality of said data requesting sources is preallocated a first time interval of each sequence and a second one of said plurality of data requesting sources is preallocated a third time interval of said each sequence.

11. The system of claim 9 wherein said predetermined ones of said microinstructions of said microprogrammed control means of each of said first and second ones of said plurality of data requesting sources correspond to alternate microinstructions resulting in cache requests being made during said preallocated time intervals of alternate ones of said control means cycles of operation for enabling the conflict-free servicing of cache requests from another source of requests during the unused preallocated time slot intervals.

12. The system of claim 11 wherein said first and second ones of said plurality of data requesting sources are central units and said another source is a FIFO buffer subsystem which processes requested data and replacement data.

13. The system of claim 5 wherein said directory means includes:

an even directory memory having a plurality of locations for storing a plurality of even addresses;

even address latches connected to said even directory memory, to said timing and control means and to said address selection means for receiving an even address;

an odd directory memory having a plurality of locations for storing a plurality of odd addresses;

odd address latches connected to said odd directory memory, to said timing and control means and to said address selection means for receiving an odd address; and, said odd and even address latches being conditioned by said timing and control means during each of said preallocated time intervals used by one of said sources to store said odd and even addresses for read out of said address information from said odd and even directory memories for accessing said requested data.

14. The system of claim 6 wherein said buffer memory means includes:

an odd buffer memory having a plurality of storage locations associated with a different one of a plurality of odd addresses;

an odd address buffer register connected to said odd buffer memory, to said timing and control means and to said first pipeline stage for receiving an odd address;

an even buffer memory having a plurality of storage locations associated with a different one of a plurality of even addresses;

an even address buffer register connected to said even buffer memory, to said timing and control means and to said first pipeline stage for receiving an even address; and, said output data register means including first and second registers coupled to first and second ones of said data processing sources;

said even and odd buffer registers being conditioned by said timing and control means during said following another one of said time intervals to store said odd and even addresses accessing said requested data from said odd and even buffer memories, a selected one of said first and second registers being enabled by said timing and control means during a subsequent time interval to store said requested data for transfer to a corresponding one of said data requesting sources.

15. A data processing system comprising:

a plurality of data processing subsystems, each being operative to generate memory requests for data, each request including an address;

a cache memory subsystem having first and second pipeline stages and being coupled to each of said data processing subsystems for receiving said data requests, said cache subsystem comprising:

timing and control means coupled to each of said data processing subsystems for generating sequences of timing signals, said timing and control means being coupled to apply said timing signals to each of said data processing subsystems for synchronizing the operations of all of said data processing subsystems with said cache subsystem, each sequence of timing signals defining a corresponding number of time slot intervals, a predetermined number of said time slot intervals being preallocated to each of said subsystems;

input selection means coupled to said data processing subsystems for selecting a request address from one of said subsystems during a corresponding preallocated one of said time slot intervals;

said first pipeline cache stage being coupled to said timing and control means and to said input selection means, said first pipeline stage conditioned by said timing and control means during preallocated ones of said time slot intervals utilized by corresponding ones of said subsystems to generate address signals in response to each said data request received from said input selection means specifying where the requested data is stored; and, said second cache pipeline stage being coupled to said timing and control means, to said plurality of said subsystems and to said first pipeline cache stage for receiving said address signals, said second cache pipeline stage being conditioned during a succeeding time slot interval to store said address signals and access the specified data for transfer to a corresponding one of said plurality of subsystems thereby enabling the conflict-free concurrent processing of requests from said plurality of data processing subsystems such that one subsystem can be utilizing the first pipeline stage while another data processing subsystem is utilizing the second pipeline stage.

16. The system of claim 15 wherein said timing and control means further includes:

master timing means being operative to generate said cycles of clock signals repetitively, each defining said number of time slot intervals; and, start pipeline clocking means for generating pipeline phase signals, said clocking means being coupled to said master timing means and to each of said subsystems, said start pipeline clocking means including:

a plurality of cycle generating means, each coupled to a different one of said subsystems and to said master timing means, and pipeline timing means coupled to said plurality of cycle generating means and to each of said pipeline stages, said cycle generating means generating start pipeline signals during said preallocated time slot intervals in response to cache requests defining the types of service required by said plurality of data processing subsystems; and, said pipeline timing means in response to each start pipeline signal generating a predetermined sequence of pipeline phase signals, different ones of said pipeline phase signals enabling each of said pipeline stages to carry out in succession those operations required to complete the processing of cache requests during each cache cycle of operation defined by said one of said cycles of clock signals.

17. The system of claim 16 wherein said system further includes a system bus and a FIFO buffer subsystem coupled to said system bus, said plurality of data processing subsystems including a number of central processing unit subsystems, each subsystem being coupled to at least one different one of said plurality of cycle generating means, each of said central processing unit subsystems during each of said preallocated time slot intervals enabling a corresponding one of said cycle generating means to initiate a CPU read cycle of operation to fetch data from said cache memory unit and said FIFO buffer subsystem being operative during those unused preallocated time slot intervals to condition different ones of said cycle generating means to initiate cache cycles for processing replacement and update data received from said system bus.

18. The system of claim 15 wherein said first one of said pipeline stages include:
   directory memory means coupled to said timing and control means, said directory memory means having a plurality of locations for storing directory addresses specifying where data is stored in said cache unit and means for generating hit signals indicating whether or not the requested data is stored in said second stage; and,
   first level command decode means coupled to said directory memory means, to said timing and control means and to each of said data processing subsystems, said first level command decode means being enabled by said request during said following one of said preallocated time slot intervals to generate control signals for causing said directory memory means to read out said information signals and generating said hit signals for accessing said requested data from said second stage.

19. The system of claim 18 wherein said second one of said pipeline stages includes:
   buffer memory means having a plurality of storage locations defined by corresponding ones of said directory addresses;
   output data register means coupled to said buffer memory means, to said timing and control means and to each of said data processing subsystems; and,
   second level command decode means coupled to said buffer means, to said timing and control means, and to said first level command decode means, said second level command decode means being enabled during said following another one of said time slot intervals to generate control signals for causing said buffer memory means to accept said information signals and access said requested data to be stored in said output data register means for said transfer to one of said subsystems.

20. The system of claim 15 wherein each of said plurality of said data processing subsystems includes:
   clocking means coupled to receive from said timing and control means clock signals which synchronize the operation of said clocking means with said cache memory unit; and,
   addressable microprogrammed control means coupled to said clocking means and to said timing and control means, said microprogrammed control means for storing and providing microinstructions during control means cycles of operation, a predetermined field of said microinstructions being coded to specify when said cache request is to be made by a corresponding one of said plurality of data processing subsystems during each of said preallocated time slot intervals.

21. The system of claim 20 wherein said predetermined fields of only predetermined ones of said microinstructions of said microprogrammed control means of each of said plurality of data processing subsystems are coded to specify that a cache request is to be made only during cycles defined by those said time slot intervals preallocated to each of said number of said data processing subsystems.

22. The system of claim 21 wherein said clocking means of each of said number of said data processing subsystems conditions said microprogrammed control means to provide said microinstructions during preallocated time slot intervals which are separated by a predetermined number of time slot intervals from those time slot intervals preallocated to another one of said data processing subsystems to enable concurrent processing of requests within said pipeline stages from said plurality of said processing subsystems.

23. The system of claim 22 wherein said predetermined number is two and wherein a first one of said plurality of data processing subsystems is preallocated at a first time slot interval of each cycle and said second one of said processing means is preallocated a third time slot interval of said each cycle.

24. The system of claim 22 wherein said predetermined ones of said microinstructions of said microprogrammed control means of each of said first and second ones of said plurality of data processing subsystems correspond to alternate microinstructions resulting in cache requests being made during said preallocated time slot intervals of alternate ones of said control means cycles for enabling the conflict-free servicing of cache requests from another source of requests during unused preallocated time slot intervals.

25. The system of claim 24 wherein said first and second ones of said plurality of processing subsystems are central processing units and said another source is a FIFO buffer subsystem which processes requested data and replacement data.

26. The system of claim 18 wherein said directory means includes:
   an even directory memory having a plurality of locations for storing a plurality of even addresses;
   even address latches connected to said even directory, to said timing and control means and to said address selection means for receiving an even address;
   an odd directory memory having a plurality of locations for storing a plurality of odd addresses;
   odd address latches connected to said odd directory memory, to said timing and control means and to said address selection means for receiving an odd address; and,
   said odd and even address latches being conditioned by said timing and control means during each of said preallocated time slot intervals used by one of said subsystems to store said odd and even addresses for read out of said address information from said odd and even directory memories for accessing said requested data.

27. The system of claim 19 wherein said buffer memory means includes:
   an odd buffer memory having a plurality of storage locations associated with a different one of a plurality of odd addresses;
   an odd address buffer register connected to said odd buffer memory, to said timing and control means and to said first pipeline stage for receiving an odd address;
   an even buffer memory having a plurality of storage locations associated with a different one of a plurality of even addresses;
   an even address buffer register connected to said even buffer memory, to said timing and control means and to said first pipeline stage for receiving an even address; and,
   said output data register means including first and second registers coupled to first and second ones of said data processing subsystems;

said even and odd buffer registers being conditioned by said timing and control means during said following another one of said time slot intervals to store said odd and even addresses according said requested data from said odd and even buffer memories, a selected one of said first and second registers being enabled by said timing and control means during a subsequent time slot interval to store said requested data for transfer to a corresponding one of said data processing subsystems.

28. A method of organizing a system for sharing a two-stage pipelined cache memory unit among a plurality of data processing sources connected thereto which require servicing of requests for data, said method comprising the steps of:

(a) generating sequences of clocking signals by timing and control apparatus included in said cache memory unit and connected to said data processing sources, said sequences of clocking signals defining a number of time intervals used to synchronize the operations of said plurality of said sources with said cache memory unit;

(b) preallocating at least one of said time intervals to each of said sources for servicing requests from each of said plurality of said sources; said two-stage pipelined cache further including first and second pipeline stages which are connected to said data processing sources;

(c) enabling said first pipeline stage during a first subsequent time interval to generate information signals in response to a data request made by a corresponding one of said plurality of sources during each preallocated time interval, said information signals specifying where in said cache memory unit the requested data is stored; and, (d) enabling the second pipeline stage during a subsequent second time interval to accept said information signals from said first pipeline stage for accessing said requested data to transfer to said corresponding one of said sources enabling the conflict-free concurrently processing of requests by said first and second pipeline stages from said plurality of said data processing sources sharing said cache memory unit such that one data processing source can be utilizing said first pipeline stage while another data processing source is utilizing said second pipeline stage.

29. The method of claim 28 wherein said step of preallocating further includes:

specifying said preallocated time intervals which are separated from each other by a predetermined number of time intervals selected for enabling said concurrent processing of requests from said plurality of said sources.

30. The method of claim 29 wherein said method further includes the step of programming each of said plurality of said sources to utilize at a maximum, preallocated time intervals occurring during alternate ones of said sequences making those unused preallocated time intervals available for conflict-free servicing of at least another one of said sources.

31. A data processing unit comprising:

a plurality of requesting sources a shared cache memory unit; connected to said shared cache memory unit, each operative to generate memory requests for accessing said shared cache memory unit, each request including an address, said cache memory unit having a plurality of pipeline stages connected to said plurality of requesting sources and first and second stages including directory and buffer storage means, respectively, said cache unit including:

timing and control means for generating sequences of timing signals, said timing and control means being coupled to apply said timing signals to each of said sources for synchronizing their operations with said cache unit, said each sequence of timing signals defining a number of time intervals in which a predetermined one of said intervals is preallocated to each of said plurality of said sources for receiving said requests;

a first one of said pipeline stages being connected to said timing and control means and to said sources;

a second one of said pipeline stages being connected to said first one of said pipeline stages, to said timing and control means and to certain ones of said sources, said timing and control means in response to each request address received during one of said preallocated time intervals, generating a series of control signals for enabling said first and second ones of said pipeline stages respectively during successive ones of said time intervals within each sequence, said first pipeline stage generating information signals by accessing said directory storage means of said first pipeline stage using said request address and to access said buffer storage means of said second pipeline stage using said information signals for reading or writing cache data as specified by said request such that one requesting source can be utilizing said first pipeline stage while aother requesting source is utilizing said second pipeline stage.

32. The data processing unit of claim 31 wherein said plurality of requesting sources includes at least one central processing units and a FIFO buffer unit.

33. The data processing unit of claim 31 wherein each of said preallocated intervals is separated by a number of intervals, said number being defined by the total number of time intervals in said sequence divided by the number of pipeline stages.

* * * * *